United States Patent [19]

Jensen et al.

[11] Patent Number: 4,475,873
[45] Date of Patent: Oct. 9, 1984

[54] WET-MOTOR PUMP

[75] Inventors: Niels D. Jensen; Kurt F. Nielsen, both of Bjerringbro, Denmark

[73] Assignee: Grundfos A/S, Bjerringbro, Denmark

[21] Appl. No.: 345,570

[22] Filed: Feb. 4, 1982

[30] Foreign Application Priority Data

Feb. 14, 1981 [DE] Fed. Rep. of Germany ....... 3105428

[51] Int. Cl.$^3$ ...................... F04B 35/04; H02K 11/00
[52] U.S. Cl. ................... 417/422; 417/423 R; 310/71; 310/86
[58] Field of Search ................... 417/422, 423 R, 902; 310/71, 86, 87

[56] References Cited

U.S. PATENT DOCUMENTS

| | | | |
|---|---|---|---|
| 2,972,308 | 2/1961 | Haggerty | 417/422 |
| 3,013,500 | 12/1961 | Bollibon et al. | 417/422 |
| 3,135,882 | 6/1964 | Mollenberg | 310/86 |
| 3,218,490 | 11/1965 | Eis et al. | 310/87 |
| 3,294,993 | 12/1966 | Komor et al. | 310/87 |
| 3,350,587 | 10/1967 | Turk | 310/71 |
| 3,457,867 | 7/1969 | Komor et al. | 417/422 |
| 3,484,860 | 12/1969 | Csaki | 310/71 |

FOREIGN PATENT DOCUMENTS 2639541 3/1978 Fed. Rep. of Germany ... 417/423 R

Primary Examiner—William L. Freeh
Assistant Examiner—Paul Neils
Attorney, Agent, or Firm—Michael N. Meller

[57] ABSTRACT

A wet-motor pump having the rotor and the bearings utilize the pumped liquid, whereas the dry stator chamber with the stator windings is separated from and sealed against the rotor chamber through a tube-shaped can. The ends of the winding wires extend freely outwards on one side of the stator stack of sheets such as through an opening in the motor housing to be connectable to electric connections of a connection box mounted on the motor housing. A power cable for supply of energy to the windings is inserted in the connection box. The ends of the windings are connected to winding terminals in the stator chamber. The winding terminals are connectable to contacts and a plug. The plug comprising a shaft surrounding and isolating the contact may be inserted through the opening in the housing and into the stator chamber. As a result, a pump is obtained whereby the electric connections between the ends of the windings and the connections in the connection box may be provided in a simple and quick manner.

1 Claim, 7 Drawing Figures

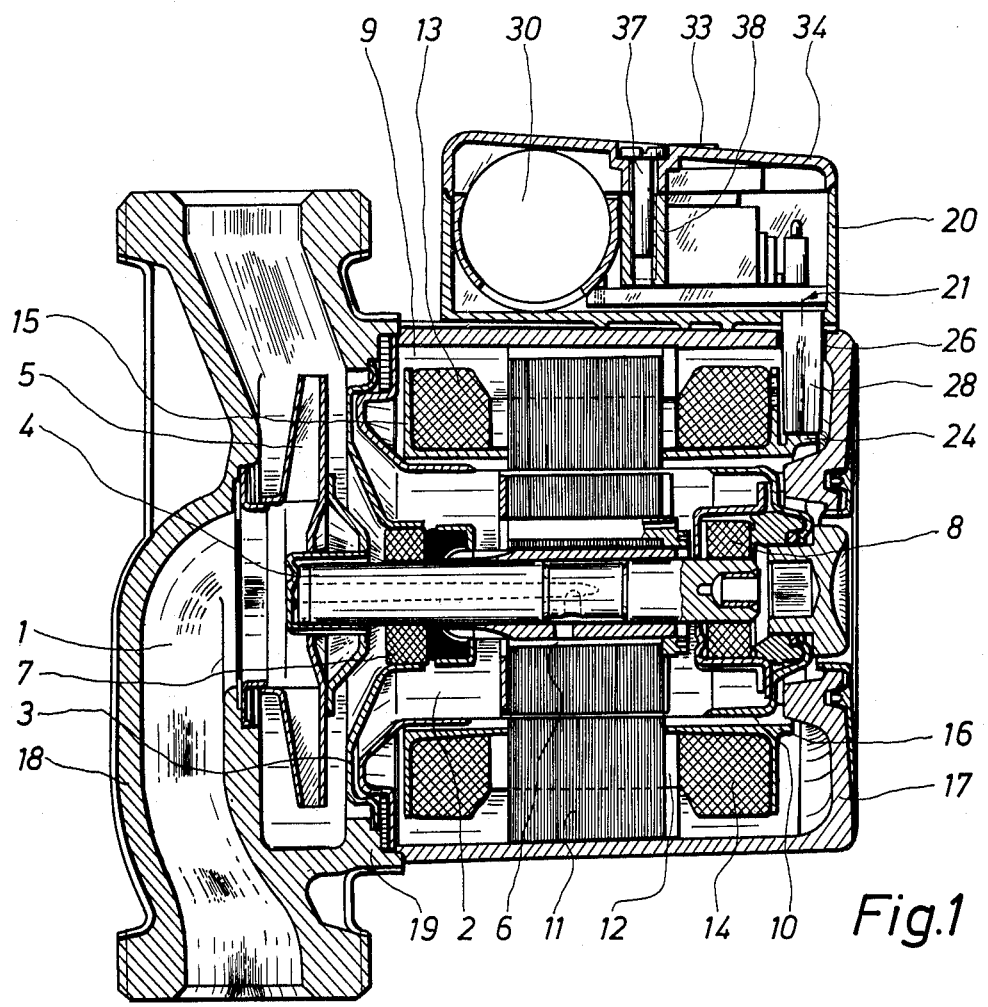
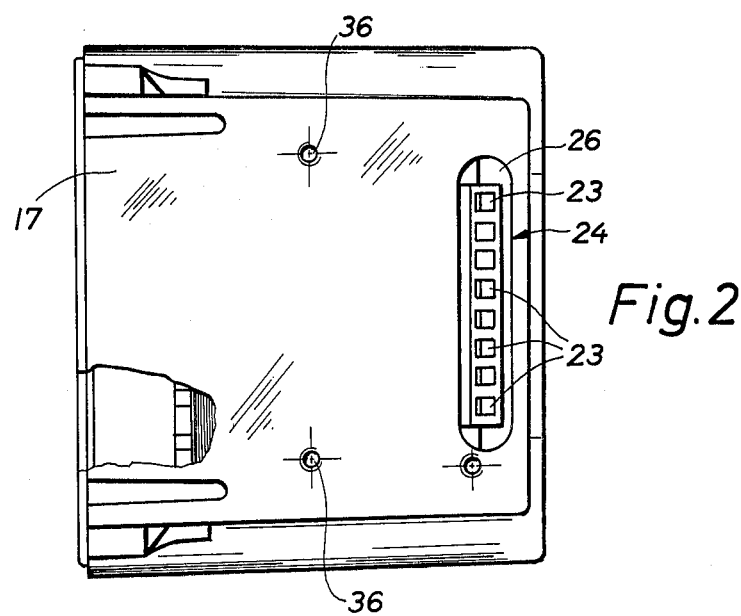

WET-MOTOR PUMP

BACKGROUND OF THE INVENTION

The invention relates to a wet-motor pump, the rotor and bearings of which utilize the pumped liquid, and the dry stator chamber of the pump including stator windings is separated from and sealed against the wet rotor chamber by means of a tube-shaped can, whereby the ends of the winding wires extend freely outwards on one side of a stator stack of sheets such as through an opening in the housing of the motor to be connectable to electric connections of a connection box on the motor housing, a power cable to be connected for the supply of energy to the windings being insertable in said connection box.

By pumps of this type, the stator with inserted windings and the protecting cover usually form a single unit, which at the mounting is insertable from one side into the interior chamber of a can-shaped motor housing. This unit may be such that the ends of the winding wires may be carried through, for instance, a slot-like opening in the housing and into the connection box and subsequently upon desired coupling be connected to the connections in question. It is, however, rather difficult and time-consuming to draw the wire ends through the opening of the housing and into the connection box. An additional disadvantage is that the stator during repairs and testing for possible deficiencies cannot easily be retracted from the motor housing, since the winding terminals in the connection box initially must be loosened and the ends of the windings be retracted from the connection box in the housing.

SUMMARY OF THE INVENTION

The object of the invention is to provide a wet motor pump, whereby the electric connections between the ends of the windings and the connections in the connection box can be provided in a simple and easy manner. Furthermore, it must be possible to open these connections without particular expense and to re-establish said connections without errors, since a successive opening of the connections must permit an unprevented retraction of the stator from the housing without involving additional measures.

A wet-motor pump of the above type is according to the invention characterized in that the ends of the winding wires are connected to winding terminals situated in the rotor chamber, and that the contacts of a plug are connectable to these winding terminals, and that said plug being provided with a shaft isolating the plug which is insertable in the stator chamber through an opening in the motor housing.

The winding terminals are according to the invention preferably located on the stator, which is formed as a single unit insertable in the motor housing.

When the winding bundles situated on each side of the stator stack of sheets are supported by a protecting cover of plastics also protecting against damages, it is according to the invention an advantage to shape a socket on one protecting cover, said socket receiving the winding terminals located side by side in a row and being adapted to receive the plugs in the correct portion of said opening in the motor housing.

As a result, the ends of the winding wires are permanently connected to the winding terminals in the stator chamber and at the stator, respectively, whereas the electric connections to the connections in the connection box may be provided in an easy and simple manner by means of the plugs preferably formed by an integrated unit in the connection box. The plug is in this case situated in the connection box, which in its bottom side situated on the motor housing must comprise a recess flush with the opening in the motor housing. In this manner, the plug can be inserted through the bottom of the connection box and the motor housing and into the stator chamber, so as to connect the contacts of the plugs with the winding terminals.

BRIEF DESCRIPTION OF DRAWING

The invention will be described below with reference to the accompanying drawing, in which:

FIG. 1 is a longitudinal, sectional view through a centrifugal pump with a canned motor, FIG. 2 is a top view of the motor housing with a stator inserted therein.

DESCRIPTION OF THE INVENTION

Figure 3:
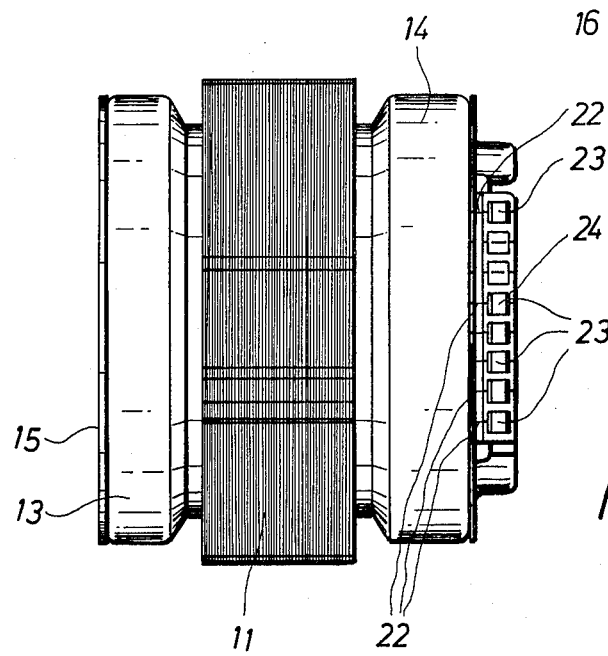
FIG. 3 is a top view of the stator.
Figure 4:
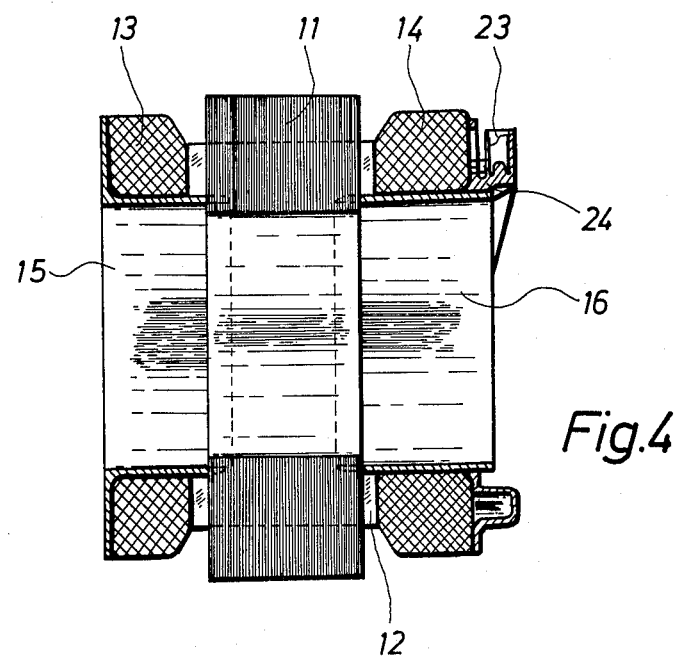
FIG. 4 is a longitudinal, sectional view through the stator at a final position illustrated in FIG. 1.

The construction and operation of the illustrated pump is known in principle, and consequently only a brief description of the basic construction is necessary.

As shown in FIG. 1, the pump comprises a pump chamber 1 and a rotor chamber 2. The pump chamber 1 is separated from the rotor chamber 2 by a partition 3. In the pump chamber 1, an impeller 5 is mounted on one end of a shaft 4. The shaft is carried by sliding bearing sleeves 7, 8 located on each side of a rotor stack of sheets 6. The pump also comprises a stator chamber 9, which is dry and sealed from a pump medium present in the rotor chamber 2 by means of a tube-shaped can 10. A stator stack of sheets 11 with inserted windings 12 is situated in the stator chamber 9. Outside the stack of sheets 11, these windings form winding bundles 13, 14 supported on both sides by means of a substantially annular protecting cover 15, 16 of a plastic material and is thus protected against damages. As illustrated in FIG. 1, the protecting covers 15, 16 are shaped in such a manner that at one side and by means of an axial portion, they engage supportingly under the winding bundles 13, 14 and at the opposite side partly cover said bundles by means of radially projecting flanges.

The motor housing 17 and the pump housing 18 are interconnected in a usual manner by means of a flange 19 on the pump housing. In the interior chamber of the can-shaped motor housing 17, the stator is axially insertable from the left in FIG. 1. The meaning of "stator" is here especially the unit comprising the stack of sheets 11, the windings 12 with the winding bundles 13, 14, and the protecting covers 15, 16 with the associated parts.

The ends of the motor windings are to the right side in FIG. 1 carried freely into the portion with the winding bundles 14. An electric connection, i.e. a plug 21, is provided between the ends of the winding wires and the connections not illustrated in detail and situated on the connection box 20 mounted on the motor housing 17. This plug will be described more detailed in the following.

The stator chamber 9 includes eight connecting points, to which the ends of the winding wires and control or monitor lines may be connected. The present embodiment includes an alternating-current motor, the windings of which require six connections. The six ends 22 of the winding wires, shown in FIG. 3, are thus connected to six winding terminals 23. The latter two unused terminals may according to requirements be used for connection of control or monitor lines, said wires and lines being connectable to corresponding connections in the connection box 20 by means of the plug 21.

A socket 24 with eight receiving portions situated side by side in a row is provided on the protecting cover 16. The winding terminals 23 are inserted into six of these receiving portions. These winding terminals may be formed by clamp knife switches known per se, whereby clamp slots 25 associated with the socket retain the isolated ends of the winding wires inserted therein in the same manner as by a traction relief, whereas the metallic winding terminals provided with cutting slots are connected to the wire ends by penetration of the wire insulation. The cover 16 and the socket 24 form a die-cast plastic member in one piece.

Figure 5:
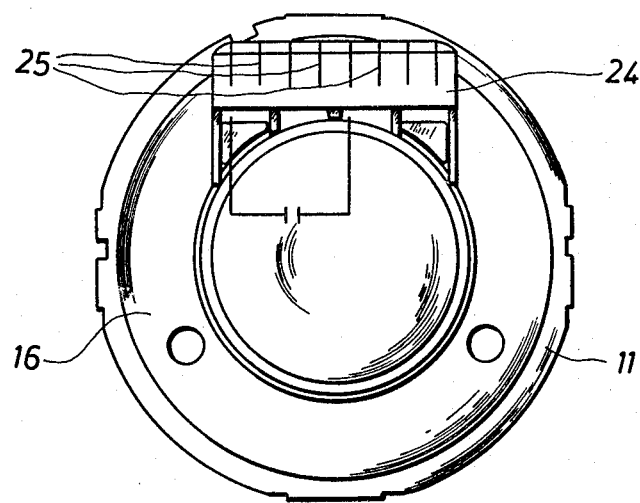
FIG. 5 is a rear view of the stator of FIG. 4.
Figure 6:
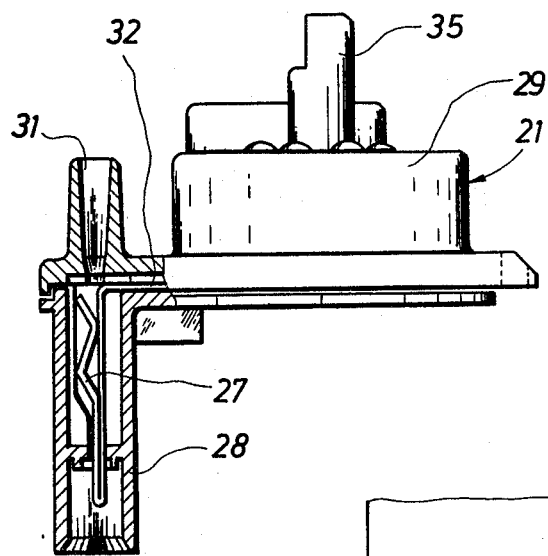
FIG. 6 is a side view of a plug, partly in section.
Figure 7:
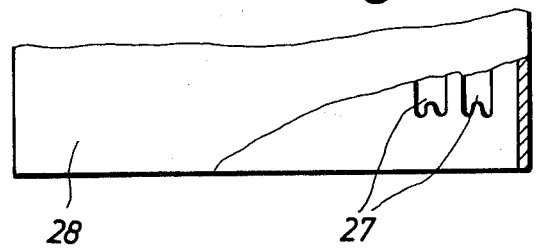
FIG. 7 is an opposite rear view of the free lower end of the plug shaft.

The row of winding terminals 23 situated side by side is shaped at a slot-like opening 26 of the motor housing 17 in such a manner that all the terminals are accessible from the outside by means of the plug 21. This plug comprises an equal number of prepared contacts 27 located side by side in a row and prepared points at the socket 24. In the illustrated embodiment, six of the eight contacts 27 are used. All the contacts are surrounded and protected by a shaft 28 of insulating material. As illustrated in FIGS. 5 and 7, the shaft 28 is in cross section formed by a rectangular housing adapted to the also rectangular socket 24 in such a manner that the shaft 28 extending through the opening 26 by its free end engages about the socket 24, whereby the electric connection between the contacts 27 and 23 is simultaneously provided.

The power cable (not shown) may be inserted from the outside into the connection boxes 20 and be connected to clamps provided at the plug 21. These clamps may be coupled to the contacts 27, for instance, by means of a pivotal switch 28 also associated with the plug so as in view of various numbers of revolutions and/or torques to permit a coupling of the necessary motor windings in response to the coupling position chosen. Besides, two of the contacts 27 are directly connected to two electrodes of a motor capacitor 30, the stripped ends of the connection of a capacitor being carried through inlet channels 31 in the shaft 28 and the plug and into a clamping connection with the contacts 27. The connections between the various points of the switch 29 and the remaining coupled contacts 27 may be provided by means of a small metal plate 32 mounted in a housing of plastics of the plug. The contacts 27 and the metal plates 32 with the permanent coupling terminals may advantageously be manufactured in one piece by punching and bending.

A switch head 33 for the operation of the switches 29 is situated on the outside of a cover 34 on the connection box 20, said switch head being detachably pressed on the shaft 35 of the switch and being unpivotally connected thereto. The socket and the bottom, respectively, of the plug 21 and the bottom of the connection box 20 comprise flushing apertures, through which some screws which are screwed into tapped holes 36 in the motor housing 17 may be screwed. The cover 34 is secured to a nipple adapter 38 in the plug 21 by means of a screw 37.

We claim:

1. A wet-motor pump of compact design having a rotor with bearings utilizing a pumped liquid and comprising: a dry stator chamber (9) surrounding in an annular fashion a wet-rotor chamber (2) sealed from said dry stator chamber by means of a tube-shaped can (10); a stator stack of sheets (11); a connection box (20) mounted on a motor housing (17); a power cable to be connected for the supply of energy to a pair of winding bundles (13, 14) being extended from said stator stack of sheets being insertable in said connection box, and wherein the ends (22) of the wires of said winding bundles are connected to a plurality of winding terminals (23) which are situated at the stator (11, 12, 15, 16) and insertable in the motor housing (17) as a unit; with the contacts (27) of a plug (21) capable of being inserted transversally to the axis of the rotor and being connected to said winding terminals, and that said plug, provided with a shaft (28) isolating the plug, is insertable in the stator chamber (9) through an opening (26) in the motor housing, wherein the pair of winding bundles on each side of the stator stack of sheets are supported by a plastic protecting cover (15, 16) and wherein a socket (24) is formed on a portion of said plastic protecting cover (16) and receives the plurality of winding terminals (23) situated side-by-side in a row, said plurality of winding terminals being adapted to mount the contacts (27) in the correct position in said opening (26) in the motor housing.

* * * * *